United States Patent [19]

Handa et al.

[11] Patent Number: 4,924,959
[45] Date of Patent: May 15, 1990

[54] OFF-ROAD VEHICLE

[75] Inventors: Akio Handa; Eiji Hosoya; Makoto Ishiwatari; Yoshihiro Kimura; Seiji Watanabe, all of Saitama, Japan

[73] Assignee: Honda Giken Kogyo Kabushiki Kaisha, Tokyo, Japan

[21] Appl. No.: 281,906

[22] Filed: Dec. 6, 1988

Related U.S. Application Data

[63] Continuation of Ser. No. 113,615, Oct. 26, 1987, abandoned.

[30] Foreign Application Priority Data

Oct. 24, 1986 [JP] Japan .................................. 61-253351
Oct. 27, 1986 [JP] Japan .................................. 61-255053

[51] Int. Cl.$^5$ ............................................. B60K 5/04
[52] U.S. Cl. .................................... 180/297; 180/312; 180/908; 280/756; 123/179 SE; 123/198 E; 296/205
[58] Field of Search ................ 180/62, 68.3, 11, 207, 180/215, 408, 72, 291, 292, 297, 298, 312, 311; 123/179 K, 179 SE, 185 A, 185 B, 185 BA, 198 E; 185/39, 40 H, 41 A; 280/13, 756; 296/102, 205

[56] References Cited

U.S. PATENT DOCUMENTS

| | | | |
|---|---|---|---|
| 2,800,189 | 7/1957 | Kummer | 180/215 X |
| 2,912,966 | 11/1959 | Mitchell | 123/179 S E X |
| 2,935,333 | 5/1960 | Ekas | 180/13 X |
| 3,312,299 | 4/1967 | Kuecker | 180/11 |
| 3,557,894 | 1/1971 | Hanley et al. | 180/312 |
| 3,616,872 | 11/1971 | Taylor | 280/756 X |
| 3,783,216 | 1/1974 | Plamper et al. | 123/179 K X |
| 3,858,566 | 1/1975 | Perry | 123/198 E X |
| 4,146,101 | 3/1979 | Plourde | 180/291 X |
| 4,217,970 | 8/1980 | Chika | 180/298 |
| 4,253,535 | 3/1981 | Kleine et al. | 280/756 X |
| 4,257,367 | 3/1981 | Fujikawa et al. | 123/179 S E X |
| 4,440,555 | 4/1984 | Chichester | 180/68.3 X |
| 4,641,854 | 2/1987 | Masuda et al. | 280/701 |

FOREIGN PATENT DOCUMENTS

| | | | |
|---|---|---|---|
| 971572 | 1/1951 | France | 296/205 |
| 51-104525 | 8/1976 | Japan . | |
| 51-109519 | 9/1976 | Japan . | |
| 53-17532 | 5/1978 | Japan . | |
| 54-19606 | 7/1979 | Japan . | |
| 174154 | 10/1983 | Japan | 123/185 BA |
| 60-134042 | 9/1985 | Japan . | |
| 1391431 | 4/1975 | United Kingdom | 123/198 E |

Primary Examiner—Charles A. Marmor
Assistant Examiner—Brian L. Johnson
Attorney, Agent, or Firm—Irving M. Weiner; Joseph P. Carrier; Pamela S. Burt

[57] ABSTRACT

An off-road vehicle includes an engine mounted on a rear portion of a vehicle frame and a recoil starter for starting the engine. The recoil starter has a pulley operatively coupled to the crankshaft of the engine, and a cord member wound around the pulley. The cord member has an outer end extending rearwardly from the recoil starter for allowing the cord member to be easily pulled from behind the vehicle frame.

9 Claims, 3 Drawing Sheets

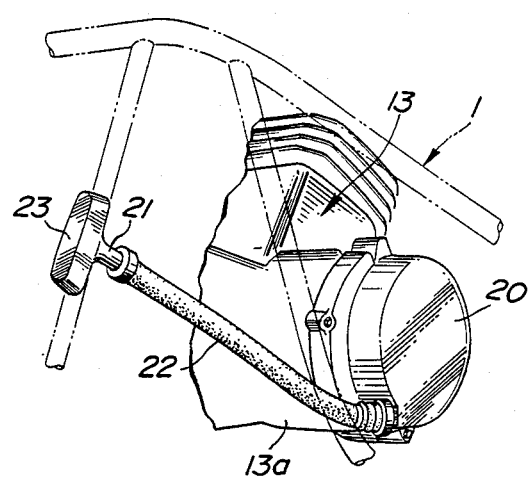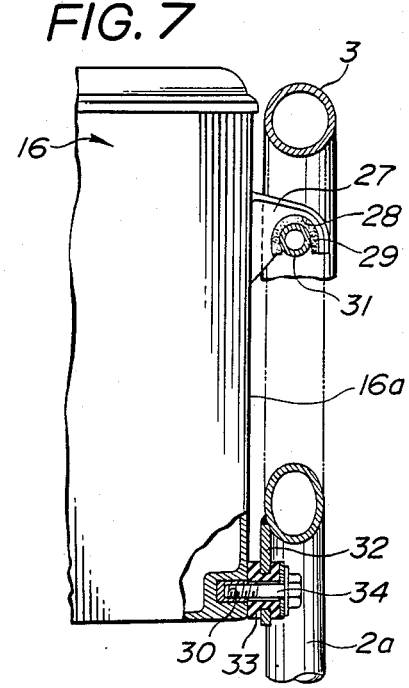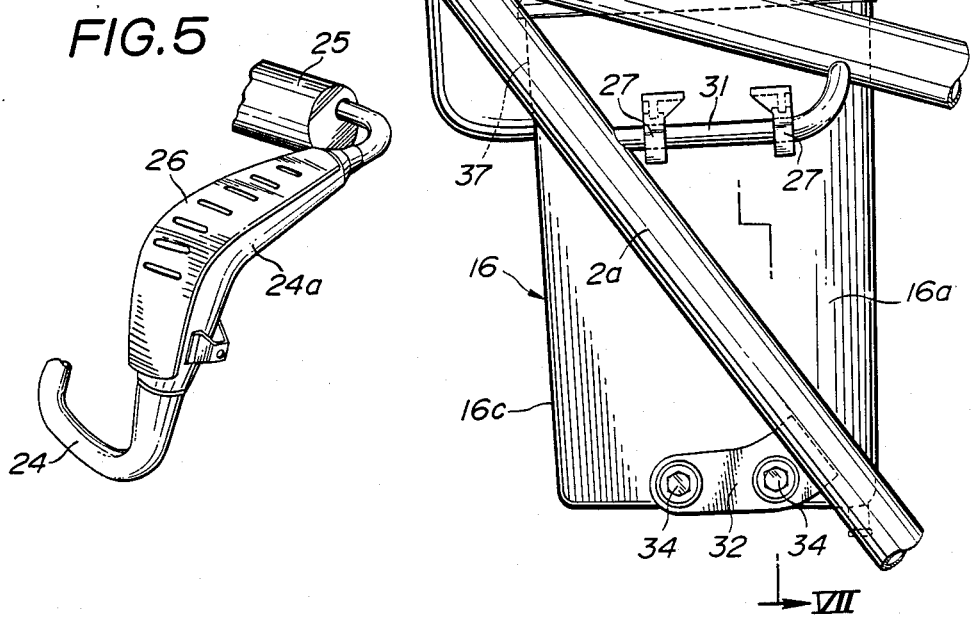

OFF-ROAD VEHICLE

This is a continuation of application Ser. No. 113,615, filed Oct. 26, 1987, now abandoned.

BACKGROUND OF THE INVENTION

1. Field of the Invention

The present invention relates to an off-road vehicle such as a four-wheeled buggy, and more particularly to an off-road vehicle having an engine that can be started by a recoil starter.

2. Description of the Relevant Art

Japanese Utility Model Publication No. 54-19606 shows an off-road vehicle known as a four-wheeled buggy with wide tires mounted on front and rear wheels. An engine is mounted on a rear portion of the vehicle frame, and various heavy components such as a fuel tank and a transmission case are divided and disposed on opposite sides of the engine, with their centers of gravity positioned in the vicinity of the axle of the rear wheels for increased running stability of the vehicle.

In the disclosed conventional off-road vehicle, the recoil rope of a recoil starter for starting engine is required to be pulled forwardly and upwardly of the vehicle frame due to the positional relationship between the engine and the fuel tank. However, a driver's seat is in the way of the recoil rope while it is pulled forwardly and upwardly, and the recoil rope cannot be pulled by the driver or operator with full force as his posture is limited.

SUMMARY OF THE INVENTION

According to the present invention, there is provided an off-road vehicle having a recoil starter for starting an engine, the recoil starter having a pulley operatively coupled to the crankshaft of the engine, and a cord member wound around the pulley, the cord member having an outer end extending rearwardly from the recoil starter for allowing the cord member to be pulled from behind the vehicle frame.

The cord member or recoil rope of the recoil starter can be pulled with maximum force by the driver or operator who can take such a posture to be able to exert the maximum pulling power. Therefore, the engine can be started without forcing the driver or operator to assume an unnatural posture.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 4 is a perspective view of a recoil starter as viewed from behind an engine;

FIG. 5 is a perspective view of an exhaust pipe as viewed from its front side;

FIG. 6 is an enlarged fragmentary side elevational view of an air cleaner case as it is mounted on a vehicle frame; and FIG. 7 is a cross-sectional view taken along line VII—VII of FIG. 6.

DETAILED DESCRIPTION OF THE PREFERRED EMBODIMENT

Figure 1:
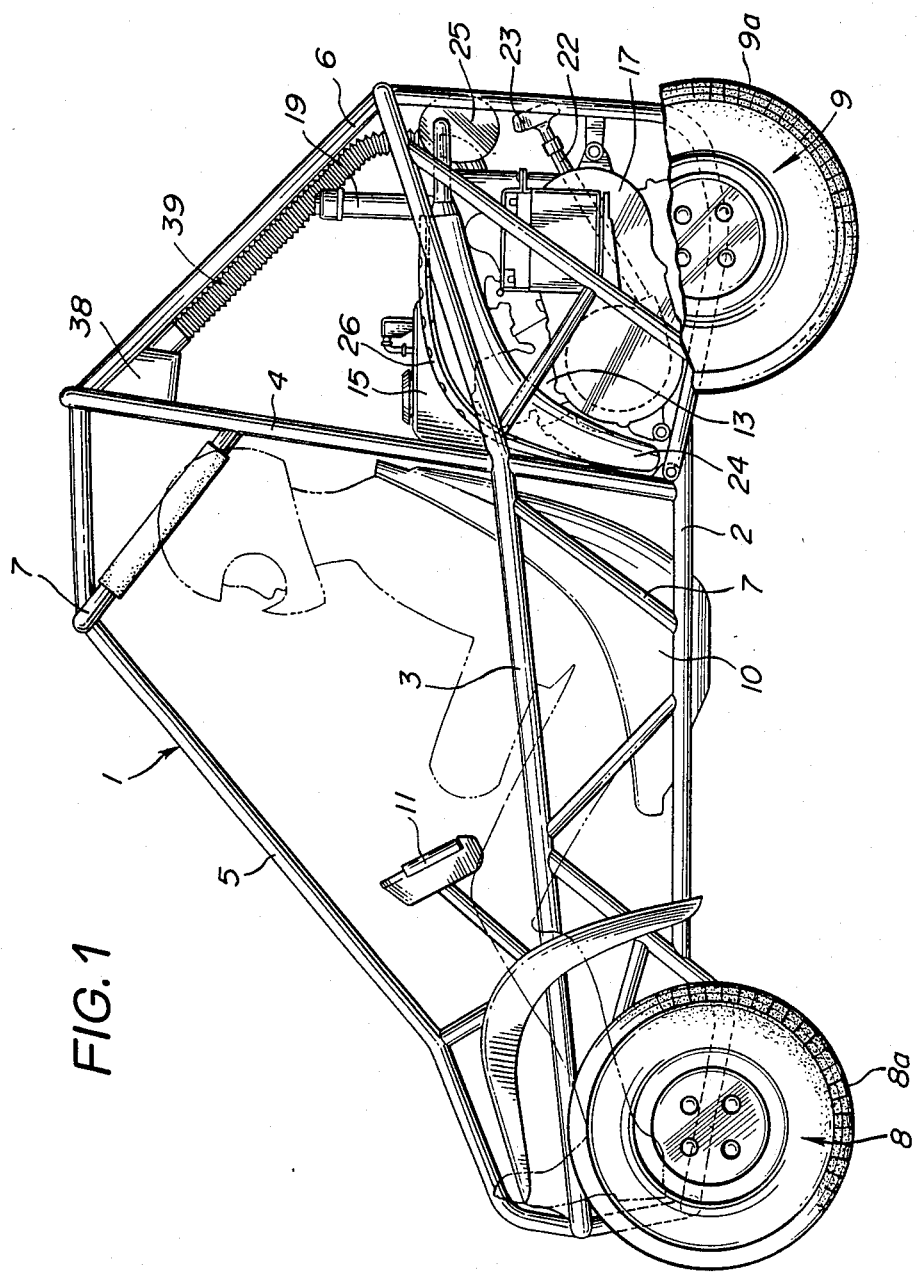
FIG. 1 is a side elevational view of an off-road vehicle according to the present invention.

As shown in FIG. 1, an off-road vehicle according to the present invention includes a vehicle frame 1 comprising a pair of laterally spaced lower frame members 2 (only one shown) extending longitudinally of the vehicle, a pair of laterally spaced side frame members 3 extending parallel to and upwardly of the lower frame members 2, an auxiliary pipe member 4 extending vertically and welded to the lower and side frame members 2, 3 at a position slightly rearward of the longitudinal center of the vehicle, a front roll bar 5 having a front end welded to the front ends of the lower frame members 2 and a rear end welded to the upper end of the auxiliary pipe 4, a rear roll bar 6 having a lower end welded to the lower frame members 2, an intermediate portion welded to the side frame members 3, and an upper end welded to the upper end of the auxiliary pipe 4, and a plurality of cross members 7 welded to and extending between the above frame members and roll bars for stiffening them. The vehicle frame 1 is in the shape of a cage as a whole.

Front and rear wheels 8, 9 are rotatably supported on front and rear portions, respectively, of the vehicle frame 1. Wide tires 8a, 9a are mounted respectively on the front and rear wheels 8, 9.

A driver's seat 10 is supported centrally on the lower frame members 2. A steering handle 11 with rod-shaped opposite side grips is positioned in front of the driver's seat 10. An engine 13 and various accessories thereof are disposed in a space surrounded by the lower frame members 2, the side frame members 3, the auxiliary pipe 4, and the rear roll bar 6 behind the engine 13.

Figure 2:
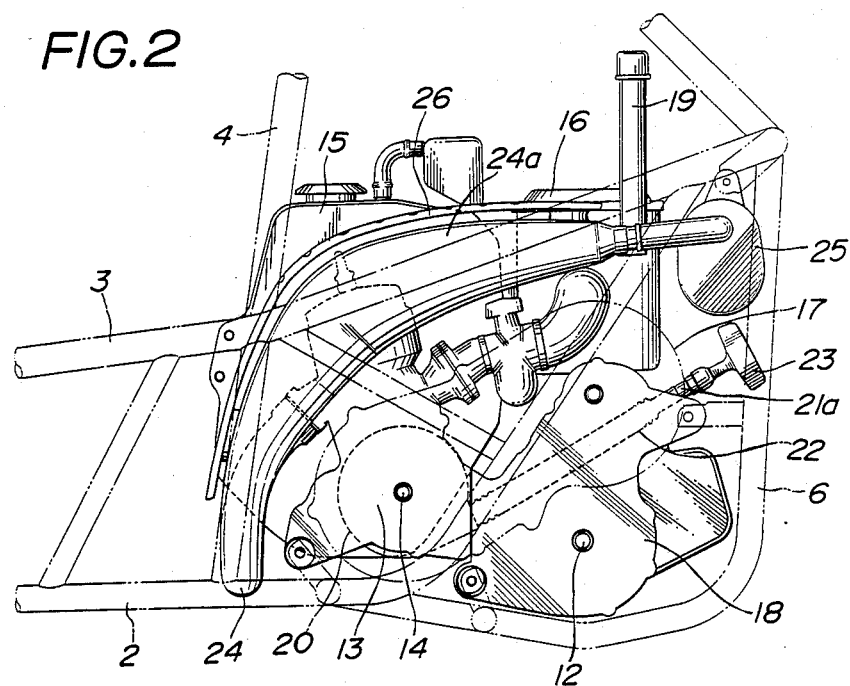
FIG. 2 is an enlarged fragmentary side elevational view of a rear portion of the off-road vehicle.
Figure 3:
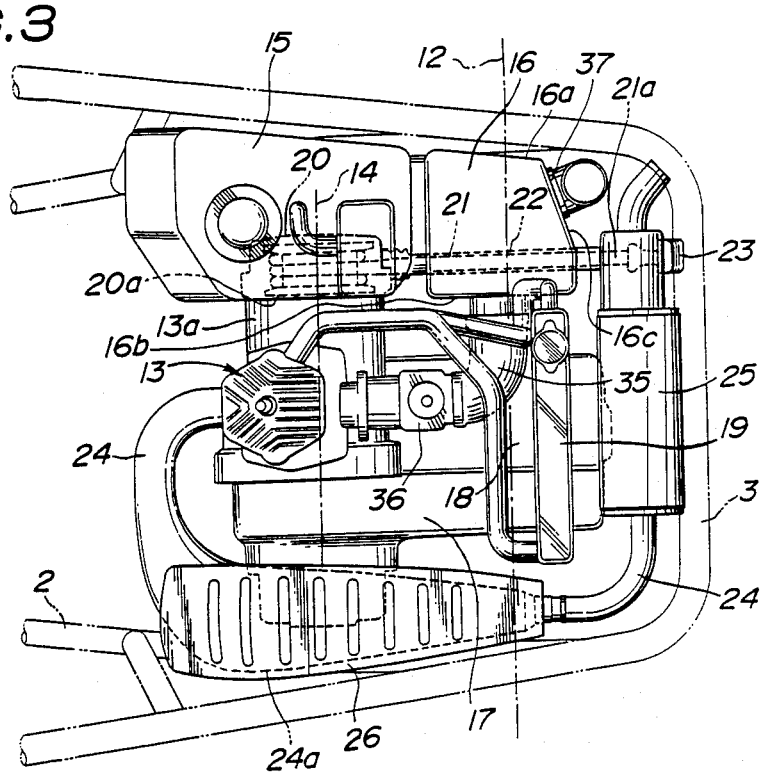
FIG. 3 is an enlarged fragmentary plan view of the rear portion of the off-road vehicle.

As shown in FIGS. 2 and 3, the engine 13 has a crankshaft 14 positioned forwardly of and and extending parallel to the axle 12 of the rear wheels 9 in the transverse direction of the vehicle frame 1. As viewed from behind the vehicle, a fuel tank 15 is positioned on the righthand side (upper side in FIG. 3) of the engine 13, and an air cleaner case 16 is disposed rearwardly of the fuel tank 15. A case 17 housing power transmitting pulleys (not shown) is disposed on the lefthand side (lower side in FIG. 3) of the engine 13. A speed reducer case 18 is located rearwardly of the engine 13, and a radiator 19 is situated above the speed reducer case 18.

As illustrated in FIG. 4, a recoil starter 20 is mounted on an outer end of the crankcase 13a of the engine 13 below the fuel tank 15. The recoil starter 20 has a pulley 20a (FIG. 3) disposed in coaxial relation to a crankshaft 14 rotatably supported in the crankcase 13a, the pulley 20a being operatively coupled to the crankshaft 14. A recoil rope 21 is trained around the pulley 20a and extends through a guide tube 22 passing under the air cleaner case 16, the recoil rope 21 having an outer end 21a positioned rearwardly and upwardly of the recoil starter 20. The guide tube 22 is attached to the vehicle frame 1 by any appropriate means (not shown). A grip 23 is fixed to the outer end 21a which is exposed out of the guide tube 22.

To operate the recoil starter 20, the grip 23 is gripped and the recoil rope 21 is pulled rearwardly. The recoil pulley 20a is rotated to rotate the crankshaft 14 for thereby starting the engine 13.

An exhaust pipe 24 extending from the engine 13 is first bent laterally in front of the engine 13 and then directed as an expansion portion 24a rearwardly and upwardly. From the rear end of the expansion portion 24a, there extends a smaller-diameter exhaust pipe bent inwardly of the vehicle and connected to a muffler 25. As better shown in FIG. 5, a protector 26 lies over the upper surface of the expansion portion 24a and has a front end portion that extends downwardly between the exhaust pipe 24 and the driver's seat 10 to prevent the heat of the exhaust pipe 24 from reaching the driver's seat 10.

The air cleaner case 16 is supported by a structure as shown in FIGS. 6 and 7.

A pair of hooks 27 spaced longitudinally of the vehicle is attached to an upper portion of the outer side surface 16a of the air cleaner case 16. The hooks 27 have downwardly opening recesses 28 in which rubber members 29 are mounted, respectively. A pair of threaded holes 30 spaced longitudinally of the vehicle is defined in a lower portion of the outer side surface 16a of the air cleaner case 16. One of the lower frame members 2 has a rear rising portion 2a. A short bar 31 is joined to and extends between the rear rising portion 2a and a portion of one of the side frame members 3 which lies above the rear rising portion 2a. A bracket 32 is fixed to an intermediate portion of the rear rising portion 2a below the bar 31.

For installing the air cleaner case 16, the hooks 27 of the air cleaner case 16 are mounted on the bar 31 with the rubber members 29 interposed between the hooks 27 and the bar 31. Then, bolts 34 are inserted through the bracket 32 and respective annular rubber members 33 disposed between the bracket 32 and the outer side surface 16a of the cleaner case 16, threadedly into the respective threaded holes 30. With the bolts 34 tightened, the air cleaner case 16 is firmly fixed in position without wobbling movement in logitudinal, transverse, and vertical directions.

Referring back to FIG. 3, a connecting tube 35 extends from an inner side surface 16b of the air cleaner case 16 which is opposite to the outer side surface 16a. The connecting tube 35 is of an L shape in its intermediate portion, as viewed from above, bent at about 90°, and has a distal end connected to a carburetor 36 mounted on the engine 13.

The L-shaped connecting tube 35 is effective to absorb or attenuate vibration from the engine 13. Therefore, the transmission of engine vibrations to the air cleaner case 16 is reduced.

The air cleaner case 16 includes a rear side surface 16c having an inlet hole 37 defined therein. The inlet hole 37 is connected to an air inlet box 38 mounted on the upper end of the rear roll bar 6 through a flexible inlet tube 39 extending along the rear roll bar 6.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A driver accommodating, buggy type, off-road vehicle comprising:
   a vehicle frame;
   an engine mounted on a rear portion of said vehicle frame behind a driver's seat, and said engine having a crankshaft;
   a fuel tank disposed laterally of the engine on one side thereof; and
   a recoil starter disposed on said one side of the engine for starting said engine;
   an air cleaner case disposed rearwardly of said fuel tank and supported by said frame;
   said recoil starter having a pulley operatively coupled to said crankshaft and a cord member wound around said pulley, said cord member having an outer end extending rearwardly from said recoil starter passing under said air cleaner case for allowing said cord member to be pulled from behind said vehicle;
   the vehicle frame including a pair of laterally spaced lower frame members extending longitudinally of the vehicle, an auxiliary pipe member having two ends connected to the lower frame members and extending vertically therefrom between the engine and the driver's seat, a front roll bar connected at a rear end thereof to the upper end of the auxiliary pipe member and extending longitudinally of the vehicle, and a rear roll bar connected at a front end thereof to the upper end of the auxiliary pipe member and extending longitudinally of the vehicle; and
   said recoil starter further having a grip fixed to the outer end of the cord member and positioned in a space surrounded by the lower frame members, the auxiliary pipe and the rear roll bar.

2. An off-road vehicle according to claim 1, wherein said pulley is coaxial with said crankshaft.

3. An off-road vehicle according to claim 1, wherein said recoil starter includes a tubular member through which said cord member is guided from said recoil starter to a position which is rearward and upward thereof.

4. An off-road vehicle according to claim 1, further including said air cleaner case coupled to said engine, said air cleaner case having a first side surface supported on said vehicle frame and a second side surface opposite to said first side surface and supported on said engine, and said air cleaner case enclosing an air cleaner therein.

5. An off-road vehicle according to claim 4, wherein said first side surface has upper and lower portions engaging said vehicle frame.

6. An off-road vehicle according to claim 4, wherein said first side surface has an upper portion held in hooking engagement with said vehicle frame and a lower portion detachably fixed to said vehicle frame.

7. An off-road vehicle according to claim 4, wherein said engine includes a carburetor, and said off-road vehicle further includes a connecting tube having one end coupled to said carburetor and the other end coupled to said second side surface of the air cleaner case.

8. An off-road vehicle according to claim 7, wherein said connecting tube has an L-shaped intermediate portion.

9. An off-road vehicle according to claim 3, wherein said frame includes a rear member positioned rearwardly of said engine and extending upwardly therefrom, and said tubular member of said recoil starter extends rearwardly and upwardly from said engine a position near said rear frame member.

* * * * *

UNITED STATES PATENT AND TRADEMARK OFFICE
CERTIFICATE OF CORRECTION

PATENT NO. : 4,924,959

DATED : May 15, 1990

INVENTOR(S) : Handa et al.

It is certified that error appears in the above-identified patent and that said Letters Patent is hereby corrected as shown below:

Column 2, line 38, delete "and" (second occurrence).

Column 3, line 36, change "logitudinal" to --longitudinal--.

Column 4, line 62 (Claim 9, line 2), after "rear" insert --frame--;
         line 65 (Claim 9, line 5), after "engine" insert --to--.

Signed and Sealed this

Eighteenth Day of February, 1992

Attest:

HARRY F. MANBECK, JR.

Attesting Officer

Commissioner of Patents and Trademarks